(No Model.)
J. & C. KRAMER.
NUT LOCK.
No. 439,279. Patented Oct. 28, 1890.
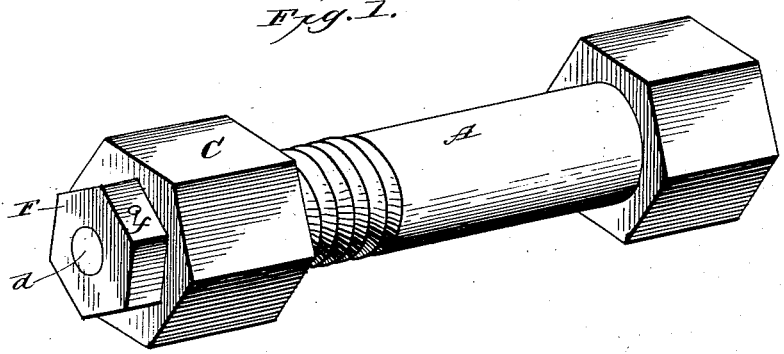
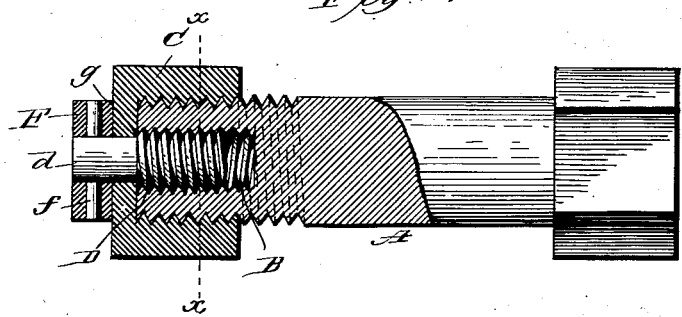
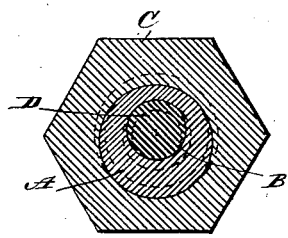 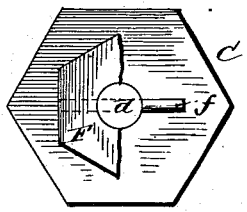
Witnesses
E. L. Smith
J. C. Hawley
Inventor
John Kramer and
Charles Kramer
By his Attorneys

UNITED STATES PATENT OFFICE.

JOHN KRAMER AND CHARLES KRAMER, OF MIDDLETOWN, PENNSYLVANIA.

NUT-LOCK.

SPECIFICATION forming part of Letters Patent No. 439,279, dated October 28, 1890.

Application filed June 12, 1890. Serial No. 355,131. (No model.)

*To all whom it may concern:*

Be it known that we, JOHN KRAMER and CHARLES KRAMER, of Middletown, in the county of Dauphin and State of Pennsylvania, have invented certain new and useful Improvements in Nut-Locks; and we do hereby declare the following to be a full, clear, and exact description of the same, reference being had to the accompanying drawings, forming a part of this specification, and to the letters of reference marked thereon.

This invention relates to that class of nut-locks in which the bolt and nut are so connected and locked together as to prevent their independent rotation without manipulating the locking devices, and has for its object to provide an exceedingly simple and effective device, which will lock the nut against movement and prevent its working loose in either direction when fixed at any desired point withir its range of movement, and which will automatically tighten at any point under the influences which usually loosen such devices, whereby it is particularly adapted for application to bolts where it is desired to lock the nut without clamping the parts held thereby, as in pitman-connections, &c.

The invention consists in certain novel details of construction and combinations and arrangements of parts, to be hereinafter described, and pointed out particularly in the claims at the end of this specification.

In the accompanying drawings, Figure 1 is a perspective view of a bolt and nut having my invention applied thereto. Fig. 2 is a longitudinal sectional view of the same. Fig. 3 is a section on the line $x\,x$, Fig. 2. Fig. 4 is a top plan of the nut with a portion of the head of the locking-bolt broken away.

Like letters of reference in the several figures indicate the same parts.

The main bolt A may be of any ordinary or preferred construction, threaded at the end, as usual, an internal bore or concavity B being formed therein, preferably concentric with the outer circumference, forming in effect a tubular-ended bolt. The internal bore in the bolt is provided with screw-threads having a pitch which is preferably about equal to that of the threads on the outside, but running in an opposite direction therefrom—that is to say, one is a right-hand and the other a left-hand thread.

The nut C is threaded internally to fit the exterior threads of the bolt, and a locking-bolt D is provided which fits within the internal bore and engages the screw-threads therein, the nut and locking-bolt being loosely connected together, so as to be capable of an independent rotation, but incapable of independent longitudinal movement.

In the preferred construction shown in the drawings the nut has a closed top or face provided with a relatively-small aperture through which the reduced portion $d$ of the locking-bolt passes, the outer end of the latter being provided with a head F, held in place by a pin $f$. By reducing the upper end of the locking-bolt a shoulder $g$ is formed inside of the nut, and the said bolt is thereby held firmly against any vertical movement, but is free to rotate independently of the nut.

With a construction such as just described it will be seen that the nut can be locked against movement in either direction at any point within its range of movement, and that entirely independent of the mere jamming action of the opposing parts, as with two nuts brought together on a single thread of a bolt, it being impossible with the present construction to move the nut without a simultaneous movement of the locking-bolt in the opposite direction and at the same speed. Should the part working against the inner face of the nut move the same in either direction, it will be seen that the nut tightens at once, and should the force still continue and tend to move the locking-bolt it will of course move the same in a direction to *lock* rather than to unlock the same.

It is obvious that with ordinary mechanical skill the invention herein disclosed may be applied to other forms of bolts and nuts than the particular one shown, and hence we do not wish to be limited specifically to such form.

Having thus described our invention, what we claim as new is—

1. The combination, with the bolt having the right and left hand screw-threads, of the nut engaging one of said threads and the locking-bolt loosely connected thereto and engaging the other thread, substantially as described.

2. The combination, with the bolt having the tubular end with internal and external threads of opposite inclination, of the nut and locking-bolt connected together and held against independent longitudinal movement but capable of a free independent rotation, said nut and bolt being adapted to engage the external and internal threads, respectively, of the bolt, substantially as and for the purpose specified.

3. The combination, with the bolt having the tubular end with internal and external threads of opposite inclination, of the nut having the closed end with a central aperture, and the locking-bolt passing through said aperture and having the shoulder on the inside and head on the outside, whereby the nut and locking-bolt are held against independent longitudinal movement, but are capable of a free independent rotation, said nut and bolt being adapted to engage the external and internal threads, respectively, of the bolt, substantially as described.

4. The combination, with the bolt having the tubular end with the internal and external threads of opposite inclination, of the nut having the closed end with the central aperture, the locking-bolt having the reduced upper end passing through said aperture and the head secured on said end outside of the nut by means of a pin, substantially as and for the purpose set forth.

JOHN KRAMER.
CHARLES KRAMER.

Witnesses:
B. W. KURTZ,
PATRICK WELSH.